Patented Oct. 24, 1950

2,527,233

UNITED STATES PATENT OFFICE 2,527,233

METHOD FOR THE PREPARATION OF ORGANOSILICON FLUORIDES

Frank J. Sowa, Cranford, N. J.

No Drawing. Application January 27, 1947,
Serial No. 724,717

7 Claims. (Cl. 260—448.2)

This invention relates to a method for the preparation of alkyl silicon fluorides, cycloalkyl silicon fluorides, aryl silicon fluorides and aralkyl silicon fluorides.

The alkyl silicon fluorides are compounds having a variety of properties and uses. Thus, the mono- and di-alkyl silicon fluorides and the lower trialkyl silicon fluorides may be hydrolyzed and condensed, in accordance with procedures which are well understood in the art, to prepare materials which are useful as film-formers, lubricants, hydraulic fluids, etc. The higher trialkyl silicon fluorides are either very difficult or impossible to hydrolyze under even very drastic conditions, and hence are useful ingredients of stable lubricating compositions and actuating fluids. Similar observations apply with respect to the cycloalkyl silicon fluorides, (i. e., silicon fluorides having attached to the silicon atoms residues of saturated alicyclic hydrocarbons obtained by the removal of an atom of hydrogen from such hydrocarbons), aryl silicon fluorides (i. e., silicon fluorides having attached to the silicon atoms residues of benzene or alkylated benzenes obtained by the removal of an atom of hydrogen from the benzene nucleus thereof), and aralkyl silicon fluorides (i. e., silicon fluorides having attached to the silicon atoms residues of alkylated benzenes obtained by the removal of an atom of hydrogen from the alkyl groups thereof). Thus, the silicon fluorides having one or two such residues per silicon atom may be hydrolyzed and condensed to form polymers which are useful as film-formers, lubricants, hydraulic fluids, etc., whereas the silicon fluorides having three such residues per silicon atom resist drastic hydrolysis, thus making them useful ingredients of stable lubricating compositions and actuating fluids.

A conventional method is known for the preparation of the alkyl, cycloalkyl, aryl and aralkyl silicon fluorides by the Grignard reaction, viz., the reaction of silicon tetrafluoride with an ether solution of an alkyl, cycloalkyl, aryl or aralkyl magnesium halide. This method is not an entirely satisfactory one, however, because of the limited solubility of silicon tetrafluoride in ether and other organic solvents. As a result, it is necessary to add the silicon tetrafluoride to the Grignard reagent, this procedure giving rise primarily to organosilicon compounds having three or four carbon to silicon linkages per silicon atom. Such products may not necessarily be the ones desired. An analogous method is known for the preparation of alkyl, cycloalkyl, aryl or aralkyl silicon chlorides by the reaction of silicon tetrachloride with an ether solution of an alkyl, cycloalkyl, aryl or aralkyl magnesium halide. However, alkyl, cycloalkyl, aryl and aralkyl silicon fluorides are not equivalent materials for all purposes to the corresponding chlorides. For example, in the treatment of a cotton textile, the foregoing silicon fluorides produce much less tenderizing of the fabric than do the corresponding silicon chlorides. Furthermore, the foregoing silicon fluorides hydrolyze less readily than the corresponding silicon chlorides, and hence the hydrolysis of the former can be more easily controlled, assuming that they can be hydrolyzed.

Alkyl, cycloalkyl, aryl and aralkyl silicon alkoxy compounds are also suitable for the production of condensates which are useful film-formers, lubricants, hydraulic fluids, etc. These materials, too, are customarily made by the reaction of an alkyl orthosilicate with an ether solution of an alkyl, cycloalkyl, aryl or aralkyl magnesium halide. This method results, however, in the production of a mixture of mono-, di- and trialkoxy silicon compounds which may be difficult to separate in a highly pure condition because of their relatively close boiling points. It is not known how to separate the mixture by chemical means. On the other hand, because of the greater differences of their boiling points, the corresponding silicon fluorides are more easily purified. Furthermore, the silicon fluorides have lower boiling points than the corresponding chlorides or alkoxy compounds, and hence are more easily distilled and lend themselves more readily to gaseous phase applications.

In view, therefore, of the limitations of the known methods for the preparation of alkyl, cycloalkyl, aryl and aralkyl silicon fluorides, of the undesirable properties of the corresponding silicon chlorides in comparison with the properties of the silicon fluorides, and of the difficulty of purifying many mixtures of the corresponding silicon alkoxy compounds produced by reacting an alkyl orthosilicate and an alkyl, cycloalkyl, aryl or aralkyl magnesium halide, it is the object of this invention to provide a new method for the preparation of the alkyl, cycloalkyl, aryl and aralkyl silicon fluorides in good yield and high purity.

This object is accomplished in accordance with the method of this invention by contacting hydrogen fluoride with a compound having the generic formula $$R_nSi(OR')_{4-n}$$

in which R is a saturated acyclic hydrocarbon radical having from one to twelve carbon atoms, a monocycloalkyl radical having from five to eight carbon atoms in the ring and having a total of not more than twelve carbon atoms, an aryl radical having a total of not more than twelve carbon atoms, or an aralkyl radical having a total of not more than twelve carbon atoms, $n$ is an integer from one to three, and R' is a saturated acyclic hydrocarbon radical having from one to five carbon atoms.

The following examples illustrate the method of this invention for the preparation of various silicon fluorides.

*Example I*

To a 500 cc. flask which was equipped with a reflux condenser and a mechanical stirrer was added 117 gms. of monoamyl triethoxysilane and 93 gms. of sodium bifluoride. The contents of the reaction flask were then heated and refluxed for about 15 minutes with constant stirring. A reaction took place, as was evidenced by the formation of ethyl alcohol. The contents of the reaction flask were subsequently distilled directly from the flask, and the fraction boiling at 75–80° C. at atmospheric pressure was collected. In view of the fact that monoamyl trifluorosilane boils at 77° C. and ethyl alcohol boils at 78° C., it was difficult to separate them from each other by distillation. Hence, the mixture was treated with anhydrous calcium chloride to absorb the alcohol and the monoamyl trifluorosilane was decanted from the calcium chloride-ethyl alcohol complex and distilled to yield 89% (based upon the amount of monoamyl triethoxysilane employed) of monoamyl trifluorosilane having a boiling point at atmospheric pressure of 77° C.

*Example II*

To a 500 ml. flask which was equipped with a reflux condenser and a mechanical stirrer was added 102 gms. of diamyl diethoxysilane (boiling point 246° C. at atmospheric pressure) and 45 gms. of ammonium bifluoride. The contents of the reaction flask were then heated and refluxed for two hours with stirring, after which the contents were distilled directly from the reaction flask at atmospheric pressure, yielding 20 gms. of diamyl difluorosilane having a boiling range of 193–200° C., 20 gms. of diamyl monofluoro monoethoxysilane having a boiling range of 200–246° C. and 30 gms. of diamyl diethoxysilane above 246° C.

*Example III*

To a 500 ml., three-necked flask which was equipped with a reflux condenser and a mechanical stirrer was added 141 gms. of phenyl triethoxysilane and 23 gms. of potassium polyacid fluoride having an available hydrogen fluoride content of 48.46% by weight. The contents of the flask were stirred and an exothermic reaction started, the reaction becoming vigorous upon touching the flask with a flame. The contents of the reaction flask were then refluxed for a short period of time, after which the contents of the flask were distilled. Phenyl trifluorosilane boils at 101–102° C. and forms with ethyl alcohol a constant boiling mixture distilling at 77° C., and in order to separate the silane from the alcohol the mixture was treated with cold concentrated sulfuric acid by adding the acid slowly and keeping the mixture in an ice bath. Since the alcohol combined with the sulfuric acid, a layer of phenyl trifluorosilane separated. This layer was distilled separately and 30 gms. of phenyl trifluorosilane was obtained boiling at 95–105° C. and 80 gms. of a mixture of the alcohol and the phenyl trifluorosilane was obtained.

*Example IV*

A three-necked, round-bottom flask equipped with a reflux condenser and a mechanical stirrer was charged with 187.2 gms. of monoamyl triethoxysilane and 100 gms. of potassium polyacid fluoride having an available hydrogen fluoride content of 48.5% by weight. The contents of the reaction flask were heated gently and then refluxed for one-half hour with stirring, after which a distillate fraction having a boiling range of 74–80° C. was collected. In view of the fact that the reaction products (ethyl alcohol and monoamyl trifluorosilane) boiled so closely, it was impossible to separate the silane by distillation. Hence, the alcohol was separated from the silane by contacting the mixture with an excess of anhydrous calcium chloride to form the calcium chloride-ethyl alcohol complex. The silane was then decanted from the calcium chloride-ethyl alcohol complex and was thereafter distilled. A 90% yield (based upon the amount of monamyl triethoxysilane used as a reactant) of monoamyl trifluorosilane was obtained having a boiling range of 74–77° C. at atmospheric pressure. The remaining 10% of unreacted monoamyl triethoxysilane was recovered from the reaction flask, which also contained potassium fluoride.

*Example V*

156 gms. of diamyl diethoxysilane (prepared in the usual manner by the reaction of ethyl orthosilicate and amyl magnesium bromide and having a boiling range of 145–155° C. at an absolute pressure of 41 mm. of mercury) and 50 gms. of potassium polyacid fluoride having an available hydrogen fluoride content of 48.5% by weight were refluxed together for one-half hour with stirring in a three-necked flask equipped with a mechanical stirrer and a reflux condenser. The reaction products were then distilled directly from the reaction flask and thereafter again distilled at atmospheric pressure using a fractionating column. An almost theoretical quantity of ethyl alcohol was obtained. In addition, there were obtained 60 gms. (a 50% yield based upon the diamyl diethoxysilane employed) of diamyl difluorosilane having a boiling range of 193–200° C., 45 gms. of diamyl monofluoro monoethoxysilane boiling between 200 and 246° C., and 10% of unreacted diamyl diethoxysilane.

*Example VI*

332 gms. of monolauryl triethoxysilane (prepared in the conventional manner by the reaction of ethyl orthosilicate and lauryl magnesium bromide) was placed in a three-necked one-liter flask which was fitted with a glass inlet tube and a take-off head with a reflux condenser. Anhydrous hydrogen fluoride was passed through a trap and then to the inlet tube of the flask. The addition of the hydrogen fluoride gas was continued at a moderate rate and the reaction mixture became quite hot (70° C.). After approximately 50 gms. of hydrogen fluoride had been added, the reaction may be separated into two layers, the upper of which was clear and the lower of which was clear but brown in color. The contents of the reaction flask were then subjected to distillation, and 130 gms. of ethyl alcohol was recovered at 78° C. (theoretical quantity 138 gms.). The residue remaining in the flask was then placed in a copper flask fitted with a fractionating column and the residue was subjected to vacuum distillation. 171 gms. of monolauryl trifluorosilane was thus obtained (a 67% yield based upon the amount of monolauryl triethoxysilane employed) having a boiling range of 98–102° C. at an absolute pressure of 6–7 mm. of mercury and having a density of 0.9403 gm. per cc. at 23° C. and an $n_D$ at 23° C. of 1.3910.

The foregoing examples illustrate the method of the present invention for the preparation of alkyl, cycloalkyl, aryl and aralkyl silicon fluorides by contacting a suitable silicon alkoxy compound with hydrogen fluoride.

In place of the alkoxy compounds shown in the examples, there may be substituted any compound having the generic formula $$R_nSi(OR')_{4-n}$$

in which R is a saturated acyclic hydrocarbon radical having from one to twelve carbon atoms, a monocycloalkyl radical having from five to eight carbon atoms in the ring and having a total of not more than twelve carbon atoms, an aryl radical having a total of not more than twelve carbon atoms or an aralkyl radical having a total of not more than twelve carbon atoms, $n$ is an integer from one to three, and R' is a saturated acyclic hydrocarbon radical having from one to five carbon atoms. Thus, when R is an alkyl radical it may suitably be the methyl, ethyl, n-propyl, i-propyl, n-butyl, isobutyl, n-amyl, n-hexyl, 2-ethylhexyl, etc. group. R' may be the methyl, ethyl, n-propyl, i-propyl, n-butyl, n-aml, etc. radical. Hence, suitable specific alkyl alkoxy compounds are monomethyl trimethoxysilane, dimethyl dimethoxysilane, trimethyl monomethoxysilane, monomethyl triethoxysilane, dimethyl diethoxysilane, trimethyl monoethoxysilane, etc. When R is a monocycloalkyl radical, it may suitably be the cyclopentyl, cyclohexyl, cycloheptyl, cyclooctyl, cyclopentylmethyl, cyclohexylethyl, cycloheptyl-n-propyl, p-methylcyclohexyl (p-methylcyclohexyl)-methyl, etc. group, and suitable specific cycloalkyl alkoxy silanes which may be used as a reactant are monocyclopentyl trimethoxysilane, dicyclohexyl diethoxysilane, tricycloheptyl monomethoxysilane, cyclopentylmethyl triethoxysilane, di-(p-methylcyclohexyl)-methyl dimethoxysilane, etc. When R is an aryl radical, it may suitably be the phenyl, o-tolyl, m-tolyl, p-tolyl, o-xylyl, m-xylyl, p-xylyl, p-ethylphenyl, cumenyl, mesityl, etc. group, and suitable specific aryl alkoxy silanes which may be used as a reactant are monophenyl trimethoxysilane, di-o-tolyl diethoxysilane, tri-m-xylyl monomethoxysilane, cumenyl tri-n-butoxysilane, di-p-ethylphenyl di-n-propoxysilane, etc. Furthermore, when R is an aralkyl radical it may suitably be the benzyl, phenylethyl, (p-methylphenyl)-methyl, (p-ethylphenyl)-ethyl, (3,5-dimethylphenyl)-methyl, etc. group, and suitable specific aralkyl alkoxy silanes which may be used as a reactant are monobenzyl trimethoxysilane, dibenzyl diethoxysilane, monophenylethyl tri-n-butoxysilane, tri-(p-methylphenyl)-methyl monoethoxysilane, di-(gamma-phenyl)-propyl dimethoxysilane, etc.

As the examples show, the hydrogen fluoride may be derived from a variety of sources. Thus, the compound hydrogen fluoride alone may be used as a fluorinating agent, or instead there may be used materials which under the reaction conditions decompose to form hydrogen fluoride. It is furthermore preferable to conduct the reaction under anhydrous conditions, in order to reduce to a minimum the hydrolysis of the alkoxy compound and of the fluoride products, and also to reduce to a minimum the reaction of hydrogen fluoride upon the reaction vessel. The reaction temperature may be varied over a wide range, as the examples show, and the reaction may be initiated by mild heating, in the event that it does not initiate itself. Also, depending upon the particular silicon fluoride which it is desired to prepare, it is desirable to choose the silicon alkoxy compound so that the alcohol and silicon fluoride products vary as widely as possible in their boiling points, thus making them more easily separated. In any event, however, the silicon fluoride and alcohol may be separated by known chemical procedures, as the examples illustrate.

I claim:

1. The method of preparing a compound having the generic formula $$R_nSiF_{4-n}$$

which comprises contacting under substantially anhydrous conditions hydrogen fluoride with a compound having the generic formula $$R_nSi(OR')_{4-n}$$

where R is a radical selected from the group consisting of saturated acyclic hydrocarbon radicals having from one to twelve carbon atoms, monocycloalkyl radicals having from five to eight carbon atoms in the ring and having a total of not more than twelve carbon atoms, aryl radicals having a total of not more than twelve carbon atoms and aralkyl radicals having a total of not more than twelve carbon atoms, $n$ is an integer from one to three, and R' is a saturated acyclic hydrocarbon radical having from one to five carbon atoms.

2. The process of claim 1 in which $n$ is one.
3. The process of claim 1 in which $n$ is one and in which R is an alkyl radical.
4. The process of claim 1 in which $n$ is two.
5. The process of claim 1 in which $n$ is two and in which R is an alkyl radical.
6. The process of claim 1 in which $n$ is three.
7. The process of claim 1 in which $n$ is three and R is an alkyl radical.

FRANK J. SOWA.

REFERENCES CITED

The following references are of record in the file of this patent:

UNITED STATES PATENTS

| Number | Name | Date |
| --- | --- | --- |
| 2,382,082 | McGregor | Aug. 14, 1945 |
| 2,386,441 | Daudt | Oct. 9, 1945 |
| 2,398,672 | Sauer | Apr. 16, 1946 |
| 2,436,777 | Petcher | Feb. 24, 1948 |
| 2,449,815 | Newkirk | Sept. 21, 1948 |

OTHER REFERENCES

Pearlson, "Jour. Amer. Chem. Soc.," vol. 67 (1945), pages 1769–1770.

Flood, "Jour. Amer. Chem. Soc.," vol. 55, (1933), pages 1735–6.

Peppard, "Jour. Amer. Chem. Soc.," vol. 68 (Jan., 1946), pages 76, 77.

Sommer, "Jour. Am. Chem. Soc.," vol. 70 (1948), pages 445–447.